(12) United States Patent 　　　(10) Patent No.:　US 12,678,730 B2

Noda 　　　(45) Date of Patent:　Jul. 14, 2026

(54) MIXED GAS SEPARATION METHOD AND MIXED GAS SEPARATION DEVICE

(71) Applicant: NGK INSULATORS, LTD., Nagoya-City (JP)

(72) Inventor: Kenichi Noda, Nagoya-City (JP)

(73) Assignee: NGK INSULATORS, LTD., Nagoya-City (JP)

( * ) Notice: Subject to any disclaimer, the term of this patent is extended or adjusted under 35 U.S.C. 154(b) by 345 days.

(21) Appl. No.: 18/338,448

(22) Filed: Jun. 21, 2023

(65) Prior Publication Data

US 2023/0330594 A1　　Oct. 19, 2023

Related U.S. Application Data

(63) Continuation of application No. PCT/JP2021/036739, filed on Oct. 5, 2021.

(30) Foreign Application Priority Data

Jan. 7, 2021　(JP) ................................. 2021-001673

(51) Int. Cl.
*B01D 53/22*　　(2006.01)
*B01D 69/14*　　(2006.01)

(52) U.S. Cl.
CPC ......... *B01D 53/228* (2013.01); *B01D 69/142* (2013.01); *B01D 2257/102* (2013.01);
(Continued)

(58) Field of Classification Search
CPC .. B01D 53/228; B01D 69/142; B01D 53/225; B01D 2257/102; B01D 2257/108; B01D 2257/504; B01D 2317/04
See application file for complete search history.

(56) References Cited

U.S. PATENT DOCUMENTS 4,701,187 A　*　10/1987　Choe ..................... C01B 21/045
　　　　　　　　　　　　　　　　　　　　95/55
4,836,833 A　*　6/1989　Nicholas .............. B01D 53/229
　　　　　　　　　　　　　　　　　　　　95/55
(Continued)

FOREIGN PATENT DOCUMENTS

CN　　　103596663 A　　2/2014
CN　　　110921628 A　　3/2020
(Continued)

OTHER PUBLICATIONS

English translation of the International Preliminary Report on Patentability (Chapter I) dated Jul. 20, 2023 (Application No. PCT/JP2021/036739).
(Continued)

*Primary Examiner* — Amber R Orlando
(74) *Attorney, Agent, or Firm* — Muncy, Geissler, Olds & Lowe, P.C.

(57) ABSTRACT

A mixed gas separation method includes supplying a mixed gas containing at least $N_2$, $H_2$, and $CO_2$ and having a $CO_2$ concentration of 30% or less by volume to a first separation membrane that selectively allows passage of $H_2$, supplying the first non-permeated gas to a second separation membrane that selectively allows passage of $CO_2$, and supplying the second non-permeated gas to a $CO_2$ collector that separates and collects $CO_2$ by a separation method other than membrane separation to collect $CO_2$ contained in the second non-permeated gas. The first non-permeated gas has a $CO_2$ concentration that is 5% or more by volume higher than or equal to the $CO_2$ concentration in the mixed gas. The second non-permeated gas has an $N_2$ concentration of 50% or more by volume and an $H_2$ concentration of 30% or less by volume.

10 Claims, 5 Drawing Sheets

(52) U.S. Cl.
   CPC .. *B01D 2257/108* (2013.01); *B01D 2257/504* (2013.01); *B01D 2317/04* (2013.01)

(56) References Cited

U.S. PATENT DOCUMENTS

| | | | | |
|---|---|---|---|---|
| 5,332,424 A | | 7/1994 | Rao et al. | |
| 5,836,833 A | * | 11/1998 | Shimosaka | A63B 37/0003 |
| | | | | 473/385 |
| 6,048,472 A | * | 4/2000 | Nataraj | C01B 3/382 |
| | | | | 423/652 |
| 7,604,681 B2 | * | 10/2009 | Malsam | B01D 71/44 |
| | | | | 95/47 |
| 9,333,457 B2 | * | 5/2016 | Sawamura | C01B 3/503 |
| 9,785,718 B2 | * | 10/2017 | Lee | G06F 16/90324 |
| 9,856,769 B2 | * | 1/2018 | Baker | B01D 53/1493 |
| 2005/0061145 A1 | * | 3/2005 | Alvin | C01B 3/505 |
| | | | | 95/56 |
| 2007/0010590 A1 | * | 1/2007 | Abbott | C10G 2/32 |
| | | | | 518/703 |
| 2010/0129284 A1 | * | 5/2010 | Niitsuma | C01B 3/382 |
| | | | | 423/437.1 |
| 2010/0260657 A1 | | 10/2010 | Niitsuma et al. | |
| 2011/0162382 A1 | * | 7/2011 | Riensche | C01B 3/16 |
| | | | | 60/39.182 |
| 2012/0111051 A1 | * | 5/2012 | Kulkarni | B01D 53/226 |
| | | | | 62/619 |
| 2012/0118011 A1 | * | 5/2012 | Terrien | F25J 3/0223 |
| | | | | 62/619 |
| 2012/0195824 A1 | | 8/2012 | Van De Graaf et al. | |
| 2012/0292574 A1 | * | 11/2012 | Terrien | F25J 3/0223 |
| | | | | 252/373 |

| | | | | |
|---|---|---|---|---|
| 2014/0144321 A1 | | 5/2014 | Sawamura et al. | |
| 2020/0307997 A1 | * | 10/2020 | Tranier | C01B 3/56 |
| 2022/0168688 A1 | * | 6/2022 | Kim | C01B 3/56 |

FOREIGN PATENT DOCUMENTS

| | | |
|---|---|---|
| DE | 694 13 472 T2 | 2/1999 |
| JP | S63-151332 A | 6/1988 |
| JP | 2008-247632 A | 10/2008 |
| JP | 2009-029674 A | 2/2009 |
| JP | 2013-503807 A | 2/2013 |
| JP | 2014-001109 A | 1/2014 |

OTHER PUBLICATIONS

J. Franz et al., "An Evaluation of $CO_2$ and $H_2$ Selective Polymeric Membranes for $CO_2$ Separation in IGCC Processes," *Journal of Membrane Science*, 2010, vol. 359, pp. 173-183 (11 pages).

Haiqing Lin et al., "$CO_2$-Selective Membranes for Hydrogen Production and $CO_2$ Capture—Part I: Membrane Development," *Journal of Membrane Science*, 2014, vol. 457, pp. 149-161 (13 pages).

S.P. Kaldis et al., "Energy and Capital Cost Analysis of $CO_2$ Capture in Coal IGCC Processes via Gas Separation Membranes," *Fuel Processing Technology*, 2004, vol. 85, pp. 337-346 (10 pages).

International Search Report and Written Opinion (Application No. PCT/JP2021/036739) dated Dec. 21, 2021.

Chinese Office Action (Application No. 202180061876.5) dated Nov. 21, 2025 (with English translation) (27 pages).

German Office Action (Application No. 11 2021 006 764.8) dated Nov. 4, 2025 (with English translation) (9 pages).

* cited by examiner

MIXED GAS SEPARATION METHOD AND MIXED GAS SEPARATION DEVICE

CROSS-REFERENCE TO RELATED APPLICATION

The present application is a continuation application of International Application No. PCT/JP2021/036739 filed on Oct. 5, 2021, which claims the benefit of priority to Japanese Patent Application No. 2021-001673 filed on Jan. 7, 2021. The entire contents of these applications are incorporated herein by reference.

TECHNICAL FIELD

The present invention relates to a technique for separating a mixed gas.

BACKGROUND ART

In order to improve the efficiency of coal-fired power generation, studies and development are in recent years being underway on integrated coal gasification combined cycle power generation. The integrated coal gasification combined cycle power generation requires to separate and collect carbon dioxide ($CO_2$) contained in a gas produced by coal gasification. However, since the gas is produced in high amounts, collection facilities will increase in size and construction and operation costs will also increase if chemical absorption using an amine absorbent is adopted as the technique for collecting $CO_2$. In view of this, consideration is being given to using a separation membrane such as a zeolite membrane to separate and collect $CO_2$ at low cost.

The integrated coal gasification combined cycle power generation may adopt oxygen-blown coal gasification using oxygen or air-blown coal gasification using air. The oxygen-blown gasification allows easy coal gasification but requires an additional plant for extracting oxygen from air. Meanwhile, the air-blown gasification eliminates the need to provide such an oxygen extraction plant and thus makes construction and operation costs for a power generation plant lower than in the case of oxygen-blown gasification. In the integrated coal gasification combined cycle power generation adopting air-blown gasification, the gas produced by coal gasification contains a relatively high concentration of nitrogen ($N_2$) and therefore the concentration of $CO_2$ becomes low. In the case of using a separation membrane to separate $CO_2$ from the gas with a low concentration of $CO_2$, the separation membrane needs to have considerably high selectivity.

As examples of techniques for separating $CO_2$ through a separation membrane, Japanese Patent Application Laid-Open Nos. 2008-247632 (Document 1) and 2009-029674 (Document 2) propose devices for producing product hydrogen from a fossil fuel serving as a starting material to separate and collect secondary $CO_2$. Specifically, these devices produce a mixed gas containing $H_2$ and $CO_2$ by steam reforming of the fossil fuel, supply the mixed gas to a hydrogen separation membrane to separate and collect $H_2$, and supply an off-gas obtained through the hydrogen separation membrane to a carbon dioxide separation membrane to separate and collect $CO_2$. These devices improve the recovery rate of $H_2$ by circulating a hydrogen-enriched gas obtained through the hydrogen separation membrane and mixing the hydrogen-enriched gas with the aforementioned mixed gas.

Japanese Patent Application Laid-Open No. 2014-001109 (Document 3) proposes a device for separating and collecting $H_2$ and $CO_2$ by causing a mixed gas obtained by steam reforming and containing $H_2$ and $CO_2$ to permeate in turn through a plurality of hydrogen separation membrane modules and a plurality of carbon dioxide separation membrane modules that are arranged alternately.

Incidentally, a mixed gas obtained by steam reforming of a fossil fuel is composed primarily of $H_2$ and $CO_2$, and therefore the mixed gas contains high concentrations of $H_2$ and $CO_2$. Since Documents 1, 2, and 3 are based on the assumption that $H_2$ and $CO_2$ are separated from such a mixed gas with high concentrations of $H_2$ and $CO_2$, it is not possible to achieve efficient separation of $CO_2$ from a mixed gas with a low concentration of $CO_2$ as in the case of the aforementioned integrated coal gasification combined cycle power generation adopting air-blown gasification.

The devices described in Documents 1 and 2 may have difficulty in achieving efficient separation of $H_2$ because the mixed gas contains a high concentration of $CO_2$ as described above and, when the mixed gas is supplied to the hydrogen separation membrane, the permeability of the hydrogen separation membrane may be inhibited by $CO_2$. In this case, the off-gas obtained through the hydrogen separation membrane has a relatively high concentration of $H_2$, and a structure such as an explosion-proof construction becomes necessary on the downstream side, e.g., in a $CO_2$ collection facility. This may complicate the device structure or may increase the device cost. According to Document 1 cited above, the hydrogen separation membrane has $H_2/CO_2$ selectivity of approximately 10 and the carbon dioxide separation membrane has $CO_2/H_2$ selectivity of approximately 30, i.e., both of the membranes have not so high selectivity. Therefore, the concentration of $CO_2$ to be separated is not so high, and if $CO_2$ is processed by carbon dioxide capture and storage (CCS) or any other process, it is necessary to concentrate $CO_2$ that has been collected.

The device described in Document 3 has a limit to increasing the recovery rate because only the separation membrane is used to separate and collect $H_2$ and $CO_2$. Besides, even if it is assumed that the device tries to increase the recovery rate by providing a $CO_2$ collection facility other than the separation membrane downstream of the separation membrane modules, whether this facility contributes to increasing the recovery rate is unknown because the composition of the gas to be introduced into the $CO_2$ collection facility is neither described nor suggested. Furthermore, the device requires the installation of a plurality of hydrogen separation membrane modules and a plurality of carbon dioxide separation membrane modules, and this may complicate the device structure and increase the device cost.

SUMMARY OF THE INVENTION

The present invention is intended for a mixed gas separation method, and it is an object of the present invention to efficiently separate $CO_2$ from a gas with a low concentration of $CO_2$.

A mixed gas separation method according to one preferable embodiment of the present invention includes a) supplying a mixed gas containing at least $N_2$, $H_2$, and $CO_2$ and having a $CO_2$ concentration of 30% or less by volume to a first separation membrane that selectively allows passage of $H_2$ to separate the mixed gas into a first permeated gas that has permeated through the first separation membrane and a first non-permeated gas that has not permeated through the first separation membrane, b) supplying the first non-permeated gas to a second separation membrane that selectively allows passage of $CO_2$ to separate the first non-permeated gas into a second permeated gas that has permeated through the second separation membrane and a second non-permeated gas that has not permeated through the second separation membrane, and c) supplying the second non-permeated gas to a $CO_2$ collector that separates and collects $CO_2$ by a separation method other than membrane separation to collect $CO_2$ contained in the second non-permeated gas. The first non-permeated gas has a $CO_2$ concentration that is 5% or more by volume higher than or equal to the $CO_2$ concentration in the mixed gas. The second non-permeated gas has an $N_2$ concentration of 50% or more by volume. The second non-permeated gas has an $H_2$ concentration of 30% or less by volume.

According to the present invention, it is possible to efficiently separate $CO_2$ from the gas with a low concentration of $CO_2$.

Preferably, after the operation a), the first permeated gas may be mixed with a gas exhausted from the $CO_2$ collector.

Preferably, after the operation a), the first permeated gas may be supplied to the $CO_2$ collector.

Preferably, the second separation membrane may have a $CO_2$ recovery rate of 70% or higher.

Preferably, the separation method used in the $CO_2$ collector to separate $CO_2$ may be chemical absorption.

Preferably, the second non-permeated gas may have an $N_2$ concentration of 60% or more by volume, and the second non-permeated gas may have a $CO_2$ concentration of 30% or less by volume.

Preferably, the second permeated gas may have a $CO_2$ concentration of 97% or more by volume.

Preferably, the mixed gas supplied to the first separation membrane in the operation a) may have a pressure of 1.5 MPaG or higher.

Preferably, the first separation membrane may have $H_2/CO_2$ selectivity of 100 or higher, and the second separation membrane may have $CO_2/H_2$ selectivity of 100 or higher.

Preferably, at least one of the first separation membrane or the second separation membrane may be a zeolite membrane.

The present invention is also intended for a mixed gas separation device. A mixed gas separation device according to one preferable embodiment of the present invention includes a first separation membrane that selectively allows passage of $H_2$, a second separation membrane that selectively allows passage of $CO_2$, a $CO_2$ collector that separates and collects $CO_2$ by a separation method other than membrane separation, a mixed-gas supplier that supplies a mixed gas containing at least $N_2$, $H_2$, and $CO_2$ and having a $CO_2$ concentration of 30% or less by volume to the first separation membrane, a first non-permeated gas passage that guides a first non-permeated gas that has not permeated through the first separation membrane in the mixed gas, to the second separation membrane, and a second non-permeated gas passage that guides a second non-permeated gas that has not permeated through the second separation membrane in the first non-permeated gas, to the $CO_2$ collector, the first non-permeated gas being supplied to the first non-permeated gas passage from the second separation membrane. The $CO_2$ collector collects $CO_2$ contained in the second non-permeated gas supplied through the second non-permeated gas passage. The first non-permeated gas has a $CO_2$ concentration that is 5% or more by volume higher than or equal to the $CO_2$ concentration in the mixed gas. The second non-permeated gas has an $N_2$ concentration of 50% or more by volume. The second non-permeated gas has an $H_2$ concentration of 30% or less by volume.

Preferably, the mixed gas separation device described above may further include a first permeated gas passage that guides a first permeated gas that has permeated through the first separation membrane to cause the first permeated gas to be mixed with a gas exhausted from the $CO_2$ collector.

Preferably, the mixed gas separation device described above may further include a first permeated gas passage that guides a first permeated gas that has permeated through the first separation membrane, to the $CO_2$ collector.

Preferably, the second separation membrane may have a $CO_2$ recovery rate of 70% or higher.

Preferably, the separation method used in the $CO_2$ collector to separate $CO_2$ may be chemical absorption.

Preferably, the second non-permeated gas may have an $N_2$ concentration of 60% or more by volume, and the second non-permeated gas may have a $CO_2$ concentration of 30% or less by volume.

Preferably, the second permeated gas that has permeated through the second separation membrane may have a $CO_2$ concentration of 97% or more by volume.

Preferably, the mixed gas supplied to the first separation membrane may have a pressure of 1.5 MPaG or higher.

Preferably, the first separation membrane may have $H_2/CO_2$ selectivity of 100 or higher, and the second separation membrane may have $CO_2/H_2$ selectivity of 100 or higher.

Preferably, at least one of the first separation membrane or the second separation membrane may be a zeolite membrane.

These and other objects, features, aspects and advantages of the present invention will become more apparent from the following detailed description of the present invention when taken in conjunction with the accompanying drawings.

DETAILED DESCRIPTION

Figure 1:
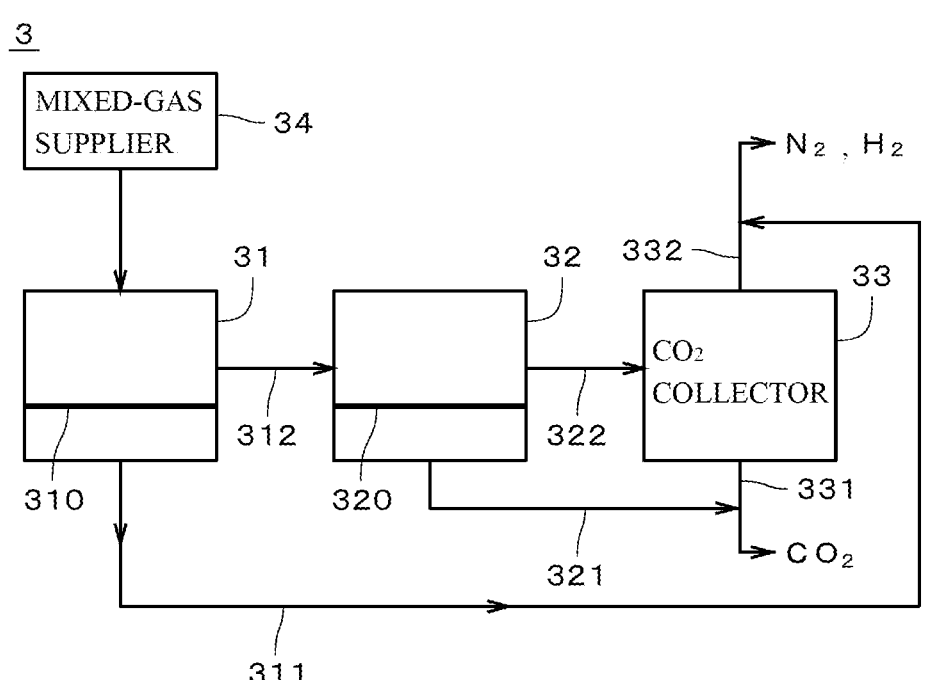
FIG. 1 is an illustration of a configuration of a mixed gas separation device according to one embodiment.

FIG. 1 is an illustration of a configuration of a mixed gas separation device 3 according to one embodiment of the present invention. In FIG. 1, each constituent element of the mixed gas separation device 3 is illustrated in schematic form. The mixed gas separation device 3 is a device for separating each of $H_2$ and $CO_2$ from a mixed gas that contains nitrogen ($N_2$), hydrogen ($H_2$), and carbon dioxide ($CO_2$). The $CO_2$ concentration in the mixed gas is lower than or equal to 30% by volume and, as described above, lower than the $CO_2$ concentration in a gas obtained by steam reforming of a fossil fuel. The mixed gas may, for example, be a gas produced by coal gasification and shift reaction in integrated air-blown coal gasification combined cycle (IGCC) power generation using air in coal gasification. Alternatively, the mixed gas may be any of various gases other than the aforementioned gas.

The mixed gas separation device 3 includes a first separation membrane module 31, a second separation membrane module 32, a $CO_2$ collector 33, a mixed-gas supplier 34, a first permeated gas passage 311, a first non-permeated gas passage 312, a second permeated gas passage 321, a second non-permeated gas passage 322, a collection passage 331, and an exhaust passage 332.

The mixed-gas supplier 34 is connected to the first separation membrane module 31. For example, the mixed-gas supplier 34 may include a pumping mechanism such as a blower or a pump that pumps the mixed gas toward the first separation membrane module 31. The pumping mechanism may include, for example, a thermoregulator and a pressure regulator that respectively adjust the temperature and pressure of the mixed gas that is to be supplied to the first separation membrane module 31. The first separation membrane module 31 and the second separation membrane module 32 are connected to each other via the first non-permeated gas passage 312. The second separation membrane module 32 and the $CO_2$ collector 33 are connected to each other via the second non-permeated gas passage 322.

The first separation membrane module 31 includes a first separation membrane 310 (i.e., $H_2$ separation membrane) that selectively allows passage of $H_2$. The second separation membrane module 32 includes a second separation membrane 320 (i.e., $CO_2$ separation membrane) that selectively allows passage of $CO_2$. Specific structures of the first separation membrane module 31 and the second separation membrane module 32 will be described later. The first separation membrane 310 may have $H_2/CO_2$ selectivity (i.e., a permeance ratio obtained by dividing permeance to $H_2$ per unit membrane area and per unit pressure difference by permeance to $CO_2$ per unit membrane area and per unit pressure difference) of preferably 100 or higher and more preferably 150 or higher. The second separation membrane 320 may have $CO_2/H_2$ selectivity (i.e., a permeance ratio obtained by dividing permeance to $CO_2$ per unit membrane area and per unit pressure difference by permeance to $H_2$ per unit membrane area and per unit pressure difference) of preferably 100 or higher and more preferably 150 or higher. There are no particular limitations on the upper limit for the $H_2/CO_2$ selectivity of the first separation membrane 310, but the upper limit may be 350 or lower when consideration is given to a realistic range. There are also no particular limitations on the upper limit for the $CO_2/H_2$ selectivity of the second separation membrane 320, but the upper limit may be 350 or higher when consideration is given to a realistic range. Note that the permeances to $H_2$ and $CO_2$ of the first separation membrane 310 and the permeances to $H_2$ and $CO_2$ of the second separation membrane 320 are values under the conditions in which each membrane is actually used.

The $CO_2$ collector 33 separates and collects $CO_2$ by a separation method other than membrane separation. Examples of the $CO_2$ separation method used in the $CO_2$ collector 33 include chemical absorption, physical absorption, adsorption, and/or solid absorption. In the present embodiment, the $CO_2$ collector 33 adopts chemical absorption (e.g., chemical absorption using an amine solution) as the $CO_2$ separation method.

Figure 2:
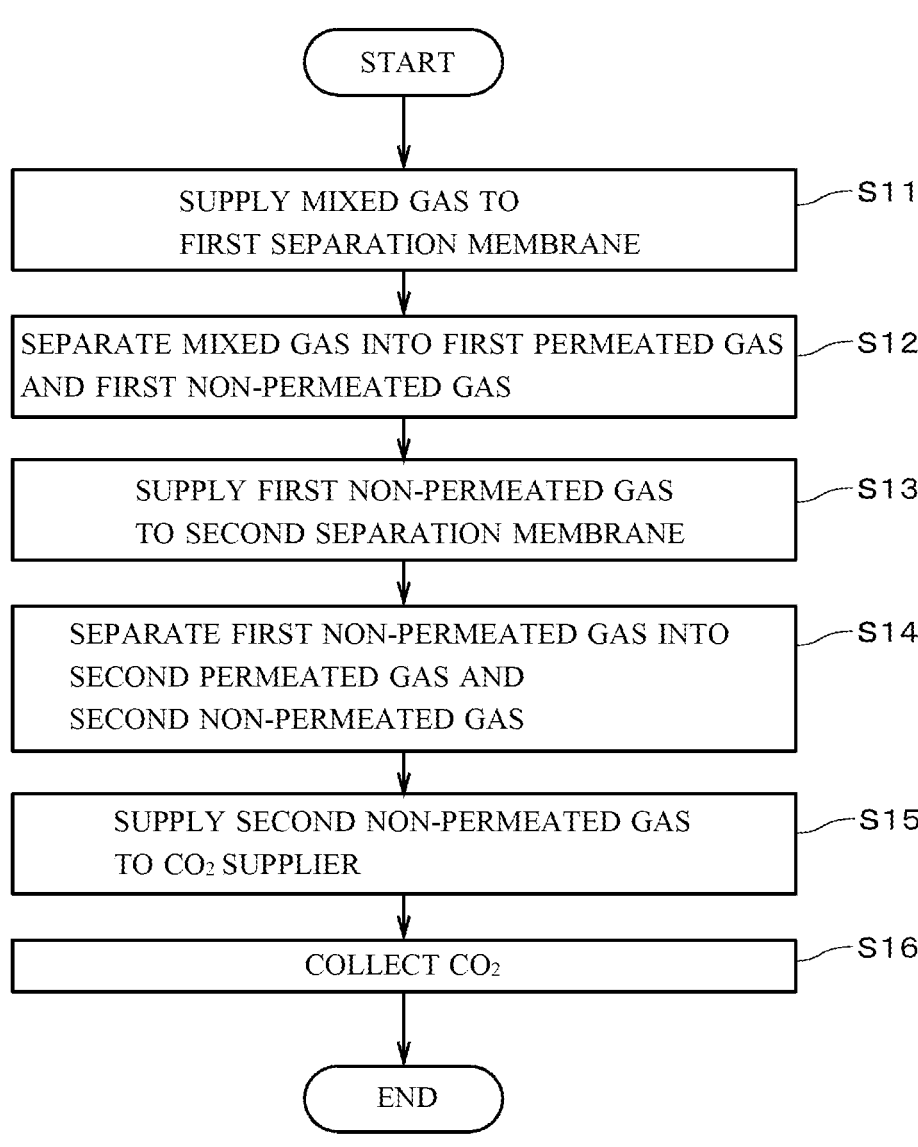
FIG. 2 is a flowchart of separation of a mixed gas.

FIG. 2 is a flowchart of separating the aforementioned mixed gas in the mixed gas separation device 3. In the mixed gas separation device 3, first, the mixed-gas supplier 34 supplies the aforementioned mixed gas containing $N_2$, $H_2$, and $CO_2$ to the first separation membrane 310 in the first separation membrane module 31 (step S11). The pressure of the mixed gas supplied to the first separation membrane module 31 may be in the range of, for example, 1 MPaG to 10 MPaG and preferably 1.5 MPaG or higher. The temperature of the mixed gas may be in the range of, for example, 10° C. to 250° C. The $N_2$ concentration in the mixed gas may be in the range of, for example, 10% by volume to 50% by volume. The $H_2$ concentration in the mixed gas may be in the range of, for example, 10% by volume to 70% by volume. The $CO_2$ concentration in the mixed gas may be in the range of, for example, 10% by volume to 30% by volume. Note that the mixed gas may contain any other gas as long as at least $N_2$, $H_2$, and $CO_2$ are contained.

In the first separation membrane module 31, $H_2$ in the mixed gas is separated from the mixed gas as a result of permeating through the first separation membrane 310. The gas that has permeated through the first separation membrane 310 (the gas that is composed primarily of $H_2$ and hereinafter may also be referred to as the "first permeated gas") may contain a gas other than $H_2$ (e.g., $N_2$ and/or $CO_2$). The first separation membrane 310 separates the mixed gas into the first permeated gas and the remaining gas from which the first permeated gas has been separated (i.e., the gas that has not permeated through the first separation membrane 310 in the mixed gas and hereinafter may also be referred to as the "first non-permeated gas") (step S12). The first non-permeated gas may contain Ha that has not permeated through the first separation membrane 310.

The first permeated gas is derived from the first separation membrane module 31 to the outside through the first permeated gas passage 311. In the example illustrated in FIG. 1, the first permeated gas passage 311 merges with the exhaust passage 332 connected to the $CO_2$ collector 33, so that the first permeated gas is mixed with the gas (mainly $N_2$ and $H_2$) exhausted from the $CO_2$ collector 33 through the exhaust passage 332 and then sent out to an external device (e.g., a gas turbine for power generation) outside the mixed gas separation device 3.

The $H_2$ concentration in the first permeated gas may be higher than the $H_2$ concentration in the mixed gas. The $H_2$ concentration in the first permeated gas may be in the range of, for example, 80% by volume to 100% by volume and preferably 90% or more by volume. The $N_2$ concentration in the first permeated gas may be in the range of, for example, 0% by volume to 5% by volume. The $CO_2$ concentration in the first permeated gas may be in the range of, for example, 0% by volume to 15% by volume. The pressure of the first permeated gas may be in the range of, for example, 0 MPaG to 1 MPaG.

The first non-permeated gas is supplied from the first separation membrane module 31 to the second separation membrane 320 in the second separation membrane module 32 through the first non-permeated gas passage 312 (step S13). The pressure of the first non-permeated gas supplied to the second separation membrane module 32 may, for example, be approximately the same as the pressure of the mixed gas supplied to the first separation membrane module 31. As described above, since the first separation membrane 310 selectively allows passage of $H_2$ in the mixed gas, the $H_2$ concentration in the first non-permeated gas is lower than the $H_2$ concentration in the mixed gas. The $H_2$ concentration in the first non-permeated gas may be in the range of, for example, 1% by volume to 25% by volume. The $CO_2$ concentration in the first non-permeated gas is 5% or more by volume higher than the $CO_2$ concentration in the mixed gas. The $CO_2$ concentration in the first non-permeated gas may be in the range of, for example, 30% by volume to 50% by volume. The $N_2$ concentration in the first non-permeated gas may, for example, be higher than the $N_2$ concentration in the mixed gas. The $N_2$ concentration in the first non-permeated gas may be in the range of, for example, 20% by volume to 70% by volume.

In the second separation membrane module 32, $CO_2$ in the first non-permeated gas is separated from the first non-permeated gas as a result of permeating through the second separation membrane 320. The gas that has permeated through the second separation membrane 320 (the gas that is composed primarily of $CO_2$ and hereinafter may also be referred to as the "second permeated gas") may contain a gas other than $CO_2$ (e.g., $N_2$ and/or $H_2$). The second separation membrane 320 separates the first non-permeated gas into the second permeated gas and the remaining gas from which second permeated gas has been separated (i.e., the gas that has not permeated through the second separation membrane 320 in the first non-permeated gas and hereinafter may also be referred to as the "second non-permeated gas") (step S14). The second non-permeated gas contains $CO_2$ that has not permeated through the second separation membrane 320.

The second permeated gas is derived from the second separation membrane module 32 to the outside through the second permeated gas passage 321. In the example illustrated in FIG. 1, the second permeated gas passage 321 merges with the collection passage 331 connected to the $CO_2$ collector 33, so that the second permeated gas is mixed with the gas (mainly $CO_2$) derived from the $CO_2$ collector 33 through the collection passage 331 and is then sent out to an external device (e.g., a storage facility for carbon dioxide capture and storage (CCS)) outside the mixed gas separation device 3.

The $CO_2$ concentration in the second permeated gas is higher than the $CO_2$ concentration in the first non-permeated gas. The $CO_2$ concentration in the second permeated gas may be in the range of, for example, 90% by volume to 100% by volume and preferably 97% or more by volume. The $N_2$ concentration in the second permeated gas may be in the range of, for example, 0% by volume to 2% by volume. The $H_2$ concentration in the second permeated gas may be in the range of, for example, 0% by volume to 10% by volume. The pressure of the second permeated gas may be in the range of, for example, 0 MPaG to 1 MPaG.

The second non-permeated gas is supplied from the second separation membrane module 32 to the $CO_2$ collector 33 through the second non-permeated gas passage 322 (step S15). The pressure of the second non-permeated gas supplied to the $CO_2$ collector 33 may, for example, be approximately the same as the pressure of the mixed gas supplied to the first separation membrane module 31 and the pressure of the first non-permeated gas supplied to the second separation membrane module 32. As described above, since the second separation membrane 320 selectively allows passage of $CO_2$ in the first non-permeated gas, the $CO_2$ concentration in the second non-permeated gas is lower than the $CO_2$ concentration in the first non-permeated gas. The $CO_2$ concentration in the second non-permeated gas may be in the range of, for example, 5% by volume to 40% by volume and preferably 30% or less by volume. For example, the $N_2$ concentration and the $H_2$ concentration in the second non-permeated gas may higher than the $N_2$ concentration and the $H_2$ concentration in the first non-permeated gas, respectively. The $N_2$ concentration in the second non-permeated gas may be in the range of, for example, 50% by volume to 90% by volume and more preferably 60% or more by volume. The $H_2$ concentration in the second non-permeated gas may be in the range of, for example, 2% by volume to 30% by volume.

The second separation membrane 320 may have a $CO_2$ recovery rate of, for example, 65% to 95% and preferably 70% or higher. The $CO_2$ recovery rate of the second separation membrane 320 is obtained by dividing the mass of $CO_2$ that has permeated through the second separation membrane 320 in the second separation membrane module 32 (i.e., the mass of $CO_2$ in the second permeated gas) by the mass of $CO_2$ in the mixed gas supplied from the mixed-gas supplier 34 (i.e., (the mass of $CO_2$ in the second permeated gas)/(the mass of $CO_2$ in the mixed gas)).

In the $CO_2$ collector 33, $CO_2$ in the second non-permeated gas is absorbed by chemical absorption and separated and collected from the second non-permeated gas (step S16). The gas collected by the $CO_2$ collector 33 (the gas that is composed primarily of $CO_2$ and hereinafter may also be referred to as the "collected gas") is derived from the $CO_2$ collector 33 to the outside through the collection passage 331. In the example illustrated in FIG. 1, since the collection passage 331 merges with the second permeated gas passage 321 as described above, the collected gas is sent out together with the second permeated gas to an external device (e.g., a storage facility for CCS) outside the mixed gas separation device 3.

The remaining gas from which $CO_2$ has been separated by the $CO_2$ collector 33 (i.e., the gas that is composed primarily of $N_2$ and $H_2$ and hereinafter may also be referred to as the "exhaust gas") is derived from the $CO_2$ collector 33 to the outside through the exhaust passage 332. In the example illustrated in FIG. 1, since the exhaust passage 332 merges with the first permeated gas passage 311 as described above, the exhaust gas from which $CO_2$ has been collected by the $CO_2$ collector 33 is sent out together with the first permeated gas to an external device (e.g., a gas turbine for power generation) outside the mixed gas separation device 3.

Figure 3:
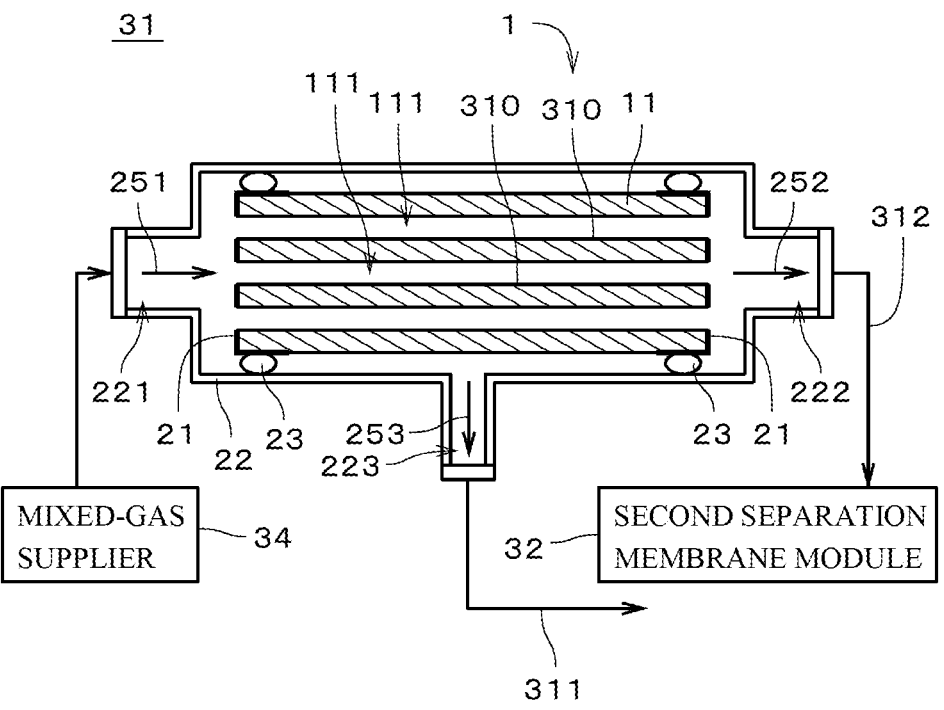
FIG. 3 is a sectional view of a configuration of a first separation membrane module.
Figure 4:
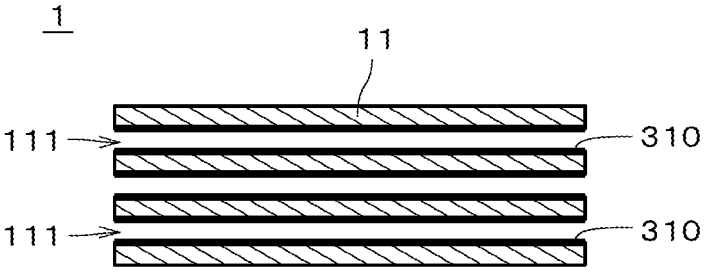
FIG. 4 is a sectional view of a separation membrane complex.
Figure 5:
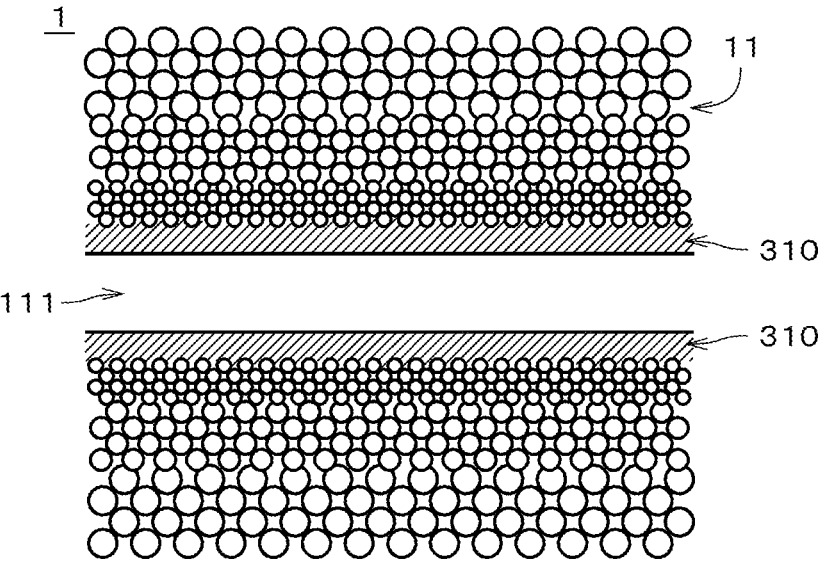
FIG. 5 is a sectional view of part of the separation membrane complex in enlarged dimensions.

Next, one example of the specific structure of the first separation membrane module 31 will be described with reference to FIGS. 3 to 5. FIG. 3 is a sectional view of a configuration of the first separation membrane module 31. FIG. 4 is a sectional view of a separation membrane complex 1 in the first separation membrane module 31. FIG. 5 is a sectional view of part of the separation membrane complex 1 in enlarged dimensions.

The first separation membrane module 31 illustrated in FIG. 3 includes the separation membrane complex 1, a sealer 21, an outer cylinder 22, and two seal members 23. The separation membrane complex 1 includes the first separation membrane 310 described above and separates $H_2$ from the mixed gas by selectively allowing passage of $H_2$. The separation membrane complex 1, the sealer 21, and the seal members 23 are placed in the outer cylinder 22.

There are no particular limitations on the shape of the outer cylinder 22, and the outer cylinder 22 may, for example, be an approximately cylindrical tube-like member. The outer cylinder 22 may be formed of, for example, stainless steel or carbon steel. The internal space of the outer cylinder 22 is an enclosed space isolated from the space around the outer cylinder 22. One end in the longitudinal direction of the outer cylinder 22 (i.e., the end on the left side in FIG. 3) is provided with a supply port 221, and the other end thereof is provided with a first exhaust port 222. The side face of the outer cylinder 22 is provided with a second exhaust port 223. The supply port 221 is connected to the mixed-gas supplier 34 described above. The first exhaust port 222 is connected to the first non-permeated gas passage 312 described above. The second exhaust port 223 is connected to the first permeated gas passage 311 described above.

As illustrated in FIGS. 4 and 5, the separation membrane complex 1 includes a support 11 and the first separation membrane 310. In FIG. 4, the first separation membrane 310 is illustrated with bold lines. In the illustration in FIG. 5, the first separation membrane 310 is cross-hatched, and the thickness of the first separation membrane 310 is greater than the actual thickness.

The support 11 is a porous member that is permeable to gas and liquid. In the example illustrated in FIG. 4, the support 11 is an integrally molded and approximately column-like member. The support 11 has a plurality of through holes 111 each extending in the longitudinal direction. That is, the support 11 is a so-called monolithic member. The longitudinal direction of the support 11 is approximately parallel to the longitudinal direction of the outer cylinder 22. The support 11 may, for example, have an approximately column-like outside shape. Each through hole 111 (i.e., each cell) may, for example, have an approximately circular section perpendicular to the longitudinal direction. In the illustration in FIG. 4, the through holes 111 have greater diameters than their actual diameter, and the number of through holes 111 is smaller than the actual number.

The length (i.e., the length in the right-left direction in FIG. 4) of the support 11 may be in the range of, for example, 10 cm to 200 cm. The outside diameter of the support 11 may be in the range of, for example, 0.5 cm to 30 cm. The distance between the central axes of each pair of adjacent through holes 111 may be in the range of, for example, 0.3 mm to 10 mm. The surface roughness (Ra) of the support 11 may be in the range of, for example, 0.1 $\mu$m to 5.0 $\mu$m and preferably 0.2 $\mu$m to 2.0 $\mu$m. Note that the support 11 may have any other shape such as a honeycomb shape, a flat plate-like shape, a tube-like shape, a cylinder-like shape, a column-like shape, or a polygonal column-like shape. In the case where the support 11 has a tube- or cylinder-like shape, the thickness of the support 11 may be in the range of, for example, 0.1 mm to 10 mm.

The material for the support 11 may be any of various substances (e.g., ceramic or metal) as long as the substance has chemical stability in the process of forming the first separation membrane 310 on the surface. In the present embodiment, the support 11 is formed of a ceramic sintered body. Examples of the ceramic sintered body selected as the material for the support 11 include alumina, silica, mullite, zirconia, titania, yttria, silicon nitride, and silicon carbide. In the present embodiment, the support 11 contains at least one type selected from among alumina, silica, and mullite.

The support 11 may contain an inorganic binding material. The inorganic binding material may be at least one selected from among titania, mullite, easily sinterable alumina, silica, glass frit, clay minerals, and easily sinterable cordierite.

The support 11 may have a mean pore diameter of, for example, 0.01 $\mu$m to 70 $\mu$m and preferably 0.05 $\mu$m to 25 $\mu$m. The mean pore diameter of the support 11 in the vicinity of the surface where the first separation membrane 310 is formed may be in the range of, for example, 0.01 $\mu$m to 1 $\mu$m and preferably 0.05 $\mu$m to 0.5 $\mu$m. The mean pore diameter may be measured by, for example, a mercury porosimeter, a perm porosimeter, or a nano-perm porosimeter. Referring to the pore size distribution of the whole of the support 11 including the surface and the interior, D5 may be in the range of, for example, 0.01 $\mu$m to 50 $\mu$m, D50 may be in the range of, for example, 0.05 $\mu$m to 70 $\mu$m, and D95 may be in the range of, for example, 0.1 $\mu$m to 2000 $\mu$m. The porosity of the support 11 in the vicinity of the surface where the first separation membrane 310 is formed may be in the range of, for example, 20% to 60%.

The support 11 may, for example, have a multilayer structure obtained by laminating a plurality of layers having different mean pore diameters in the thickness direction. The mean pore diameter and the sintered particle diameter of a surface layer that includes the surface where the first separation membrane 310 is formed are smaller than the mean pore diameters and the sintered particle diameters of the other layers different from the surface layer. The mean pore diameter of the surface layer of the support 11 may be in the range of, for example, 0.01 $\mu$m to 1 $\mu$m and preferably 0.05 $\mu$m to 0.5 $\mu$m. In the case where the support 11 has a multilayer structure, the material for each layer may be any of the substances described above. The multiple layers forming the multilayer structure may be formed of the same material, or may be formed of different materials.

The first separation membrane 310 is an approximately cylinder-like membrane provided on approximately the entire inside surfaces of the through holes 111 of the support 11. The first separation membrane 310 is a dense porous membrane having micropores. The first separation membrane 310 may, for example, be an inorganic membrane and preferably a zeolite membrane. The zeolite membrane as used herein refers to at least a membrane obtained by forming a zeolite in membranous form on the surface of the support 11, and does not include a membrane obtained by simply dispersing zeolite particles in an organic membrane. Note that the zeolite membrane may include two or more types of zeolites having different structures or different compositions. In the case where the first separation membrane 310 is a zeolite membrane, the first separation membrane 310 separates $H_2$ from the mixed gas, using a molecular-sieving function.

As illustrated in FIG. 3, the sealer 21 is a member that is mounted on both end portions in the longitudinal direction (i.e., the right-left direction in FIG. 3) of the support 11 and that coats and seals both end faces in the longitudinal direction of the support 11 and the outside surfaces in the vicinity of the both end faces. The sealer 21 prevents inflow and outflow of gas and liquid from the both end faces of the support 11. For example, the sealer 21 may be a plate-like or membranous member formed of glass or resin. The material and shape of the sealer 21 may be approximately changed. The sealer 21 has a plurality of openings that overlap the plurality of through holes 111 of the support 11, so that the both ends in the longitudinal direction of each through hole 111 of the support 11 are not coated by the sealer 21. Accordingly, the inflow and outflow of gas and liquid from these ends into the through holes 111 are possible.

The two seal members 23 are arranged along the entire circumference between the outside surface of the separation membrane complex 1 and the inside surface of the outer cylinder 22 in the vicinity of the both end portions in the longitudinal direction of the separation membrane complex 1. Each seal member 23 is an approximately ring-shaped member formed of a material that is impermeable to gas and liquid. The seal members 23 may, for example, be O-rings formed of resin having flexibility. The seal members 23 are in tight contact with the outside surface of the separation membrane complex 1 and the inside surface of the outer cylinder 22 along the entire circumference. In the example illustrated in FIG. 3, the seal members 23 are in tight contact with the outside surfaces of the sealers 21 and are indirectly in tight contact with the outside surface of the separation membrane complex 1 via the sealer 21. The space between the seal members 23 and the outside surface of the separation membrane complex 1 and the space between the seal members 23 and the inside surface of the outer cylinder 22 are sealed so as to almost or completely disable the passage of gas and liquid.

In the first separation membrane module 31, the mixed gas sent out of the mixed-gas supplier 34 is supplied to the inside of the outer cylinder 22 as indicated by an arrow 251. The mixed gas is introduced into each through hole 111 of the support 11 from the left end in FIG. 3 of the separation membrane complex 1. The aforementioned first permeated gas composed primarily of $H_2$ permeates through the first separation membrane 310 provided on the inside surface of each through hole 111 and the support 11 and is derived out from the outside surface of the support 11. As indicated by an arrow 253, the first permeated gas is guided to the first permeated gas passage 311 via the second exhaust port 223. The first non-permeated gas passes through each through hole 111 of the support 11 from the left side to the right side in FIG. 3 and, as indicated by an arrow 252, guided to the first non-permeated gas passage 312 via the first exhaust port 222 and supplied to the second separation membrane module 32.

Figure 6:
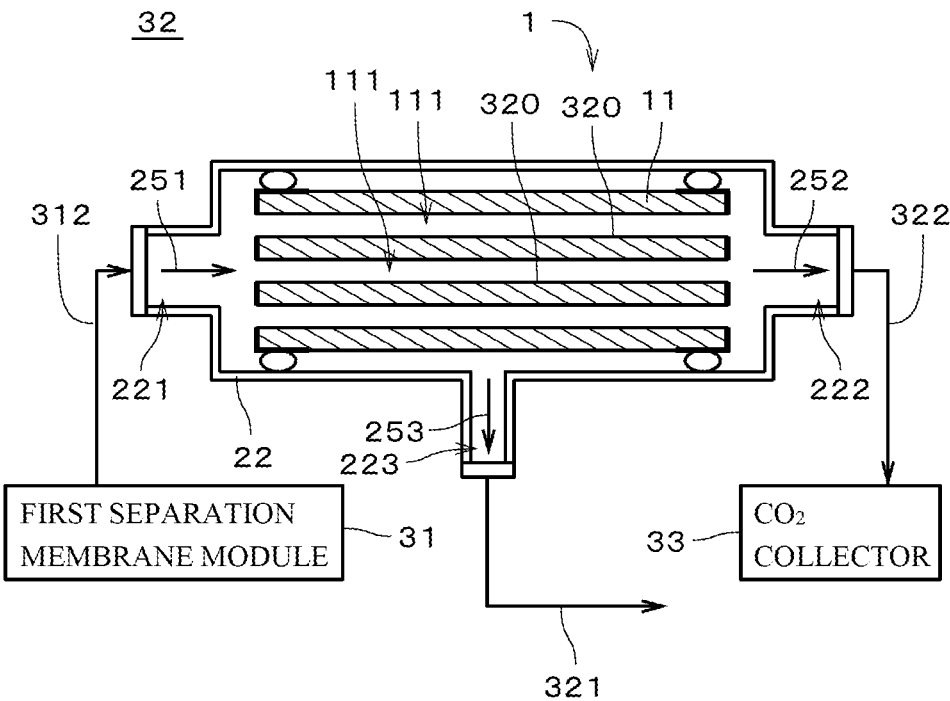
FIG. 6 is a sectional view of a configuration of a second separation membrane module.

FIG. 6 is a sectional view showing one example of the specific structure of the second separation membrane module 32. In the present embodiment, the structure of the second separation membrane module 32 is approximately the same as the structure of the first separation membrane module 31, except that the separation membrane complex 1 includes the second separation membrane 320, instead of the first separation membrane 310. In FIG. 6, among constituent elements of the second separation membrane module 32, those that correspond to the constituent elements of the first separation membrane module 31 are given the same reference signs.

Like the first separation membrane 310, the second separation membrane 320 is an approximately cylinder-like membrane provided on approximately the entire inside surfaces of the through holes 111 of the support 11. The second separation membrane 320 is a dense porous membrane having micropores. For example, the second separation membrane 320 may be an inorganic membrane and preferably a zeolite membrane. In the case where the second separation membrane 320 is a zeolite membrane, the second separation membrane 320 separates $CO_2$ from the first non-permeated gas, using an affinity for $CO_2$.

In the second separation membrane module 32, as indicated by an arrow 251, the first non-permeated gas sent out of the first separation membrane module 31 is supplied to the inside of the outer cylinder 22 through the first non-permeated gas passage 312 and via the supply port 221. The first non-permeated gas is introduced into each through hole 111 of the support 11 from the left end in FIG. 6 of the separation membrane complex 1. The aforementioned second permeated gas composed primarily of $CO_2$ permeates through the second separation membrane 320 provided on the inside surface of each through hole 111 and on the support 11 and is derived out from the outside surface of the support 11. As indicated by an arrow 253, the second permeated gas is guided to the second permeated gas passage 321 via the second exhaust port 223. The second non-permeated gas also passes through each through hole 111 of the support 11 from the left side to the right side in FIG. 6 and, as indicated by the arrow 252, guided to the second non-permeated gas passage 322 via the first exhaust port 222 and supplied to the $CO_2$ collector 33.

The following description is given of a specific example of the zeolite membrane usable as the first separation membrane 310 and the second separation membrane 320. The zeolite membrane may have a thickness of, for example, 0.05 μm to 30 μm, preferably 0.1 μm to 20 μm, and more preferably 0.5 μm to 10 μm. Increasing the thickness of the zeolite membrane improves separation performance. Reducing the thickness of the zeolite membrane increases permeance. The surface roughness (Ra) of the zeolite membrane may, for example, be less than or equal to 5 μm, preferably less than or equal to 2 μm, more preferably less than or equal to 1 am, and yet more preferably less than or equal to 0.5 μm.

The pore diameters of zeolite crystals contained in the zeolite membrane (hereinafter, also simply referred to as the "pore diameters of the zeolite membrane") is greater than or equal to 0.2 nm and less than or equal to 0.8 nm, preferably greater than or equal to 0.3 nm and less than or equal to 0.7 nm, and more preferably greater than or equal to 0.3 nm and less than or equal to 0.5 nm. The pore diameters of the zeolite membrane refer to the diameters (i.e., minor axes) of pores in a direction approximately perpendicular to the maximum diameter (i.e., the major axis that is the maximum value for the distance between oxygen atoms) of pores in the zeolite crystals that configure the zeolite membrane. The pore diameters of the zeolite membrane are smaller than the mean pore diameter in the surface of the support 11 where the zeolite membrane is provided.

In the case where the zeolite membrane is composed of a maximum n-membered ring zeolite, the minor axis of an n-numbered ring pore is assumed to be the pore diameter of the zeolite membrane. In the case where the zeolite has a plurality of types of n-membered ring pores where n is the same number, the minor axis of an n-membered ring pore that has a largest minor axis is assumed to be the pore diameter of the zeolite membrane. Note that the n-membered ring refers to a portion in which n oxygen atoms constitute the framework of a pore and each oxygen atom is bonded to a T atom described later to form a cyclic structure. The n-membered ring also refers to a portion that forms a through hole (channel), and does not refer to a portion that does not form a through hole. The n-membered ring pore refers to a small pore formed of an n-membered ring. From the viewpoint of improving selectivity, the aforementioned zeolite membrane may preferably contain a maximum 8- or less-membered ring zeolite (e.g., 6- or 8-membered ring zeolite).

The pore diameter of the zeolite membrane is uniquely determined by the framework structure of the zeolite and can be obtained from a value disclosed in "Database of Zeolite Structures" by the International Zeolite Association, [online], from the Internet <URL: http://www.iza-structure.org/databases/>.

There are no particular limitations on the type of the zeolite of the zeolite membrane, and examples of the zeolite include AEI-, AEN-, AFN-, AFV-, AFX-, BEA-, CHA-, DDR-, ERI-, ETL-, FAU- (X-type, Y-type), GIS-, IHW-, LEV-, LTA-, LTJ-, MEL-, MFI-, MOR-, PAU-, RHO-, SOD-, and SAT-type zeolites. In the case where the zeolite is an 8-membered ring zeolite, examples of the zeolite include AEI-, AFN-, AFV-, AFX-, CHA-, DDR-, ERI-, ETL-, GIS-, IHW-, LEV-, LTA-, LTJ-, RHO-, and SAT-type zeolites.

The zeolite of the zeolite membrane may, for example, contain at least one type selected from among silicon (Si), aluminum (Al), and phosphorus (P) as T atoms (i.e., atoms located in the center of an oxygen tetrahedron ($TO_4$) constituting the zeolite). The zeolite of the zeolite membrane may, for example, be a zeolite that contains only Si or both Si and Al as the T atoms, an AlPO-type zeolite that contains Al and P as the T atoms, an SAPO-type zeolite that contains Si, Al, and P as the T atoms, an MAPSO-type zeolite that contains magnesium (Mg), Si, Al, and P as the T atoms, or In the mixed gas separation device 3, the first separation membrane 310 and the second separation membrane 320 may further include membranes (e.g., a functional membrane or a protection membrane laminated on the zeolite membrane) other than the zeolite membrane, in addition to the zeolite membrane. The first separation membrane 310 and the second separation membrane 320 may be inorganic membranes other than the zeolite membrane (e.g., silica membranes or carbon membranes), or may be membranes other than inorganic membranes (e.g., organic membranes). The first separation membrane 310 and the second separation membrane 320 may be membranes of the same type, or may be membranes of different types. Preferably, at least one of the first separation membrane 310 or the second separation membrane 320 may be a zeolite membrane.

Figure 7:
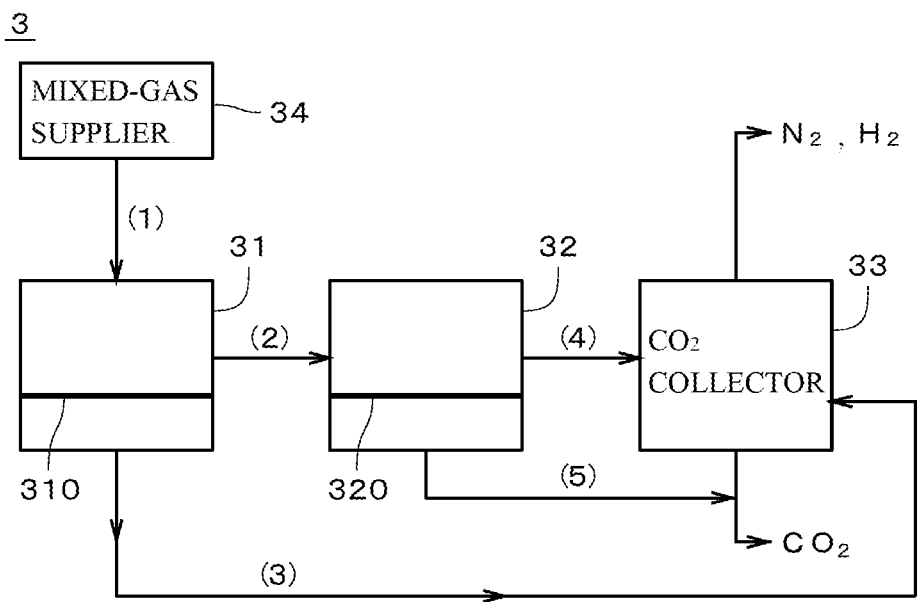
FIG. 7 is an illustration of a configuration of a different mixed gas separation device.

Next, performance of the first separation membrane 310 and the second separation membrane 320 and the results of separating $H_2$ and $CO_2$ will be described with reference to FIG. 7 and Tables 1 to 5. Almost like FIG. 1, FIG. 7 is an illustration of the configuration of the mixed gas separation device 3. In FIG. 7, the arrows indicating the flow of the mixed gas supplied from the mixed-gas supplier 34 to the first separation membrane module 31, the flow of the first non-permeated gas derived from the first separation membrane module 31, the flow of the first permeated gas derived from the first separation membrane module 31, the flow of the second non-permeated gas derived from the second separation membrane module 32, and the flow of the second permeated gas derived from the second separation membrane module 32 are respectively given reference signs (1) to (5).

TABLE 1

| | | First Separation Membrane $H_2/CO_2$ Selectivity = 100 | | Second Separation Membrane $CO_2/H_2$ Selectivity = 100 | |
| --- | --- | --- | --- | --- | --- |
| | (1) Mixed Gas | (2) First Non-Permeated Gas | (3) First Permeated Gas | (4) Second Non-Permeated Gas | (5) Second Permeated Gas |
| $N_2$ | 45.0 | 59.5 | 0.4 | 81.1 | 0.6 |
| $H_2$ | 30.0 | 8.1 | 97.2 | 10.8 | 0.7 |
| $CO_2$ | 25.0 | 32.4 | 2.4 | 8.1 | 98.7 | a ZnAPSO-type zeolite that contains zinc (Zn), Si, Al, and P as the T atoms. Some of the T atoms may be replaced by other elements.

The zeolite membrane may, for example, contain Si. For example, the zeolite membrane may contain any two or more of Si, Al, and P. The zeolite membrane may contain alkali metal. The alkali metal may, for example, be sodium (Na) or potassium (K). In the case where the zeolite membrane contains Si atoms and Al atoms, the Si/Al ratio in the zeolite membrane may, for example, be higher than or equal to one and lower than or equal to a hundred thousand. The Si/Al ratio refers to the molar ratio of Si elements to Al elements contained in the zeolite membrane. The Si/Al ratio in the zeolite membrane may be adjusted by adjusting, for example, the compounding ratio of an Si source and an Al source in a starting material solution, which will be described later.

TABLE 2

| | | No First Separation Membrane | | Second Separation Membrane | |
| --- | --- | --- | --- | --- | --- |
| | | (2) | (3) | $CO_2/H_2$ Selectivity = 380 | |
| | (1) Mixed Gas | First Non-Permeated Gas | First Permeated Gas | (4) Second Non-Permeated Gas | (5) Second Permeated Gas |
| $N_2$ | 45.0 | — | — | 56.4 | 0.2 |
| $H_2$ | 30.0 | — | — | 37.3 | 1.1 |
| $CO_2$ | 25.0 | — | — | 6.3 | 98.7 |

TABLE 3

| | (1) Mixed Gas | First Separation Membrane H$_2$/CO$_2$ Selectivity = 10 | | Second Separation Membrane CO$_2$/H$_2$ Selectivity = 30 | |
| | | (2) First Non-Permeated Gas | (3) First Permeated Gas | (4) Second Non-Permeated Gas | (5) Second Permeated Gas |
|---|---|---|---|---|---|
| N$_2$ | 45.0 | 64.0 | 3.5 | 84.0 | 2.4 |
| H$_2$ | 30.0 | 7.5 | 79.2 | 9.1 | 2.6 |
| CO$_2$ | 25.0 | 28.5 | 17.3 | 6.9 | 95.0 |

TABLE 4

| | (1) Mixed Gas | First Separation Membrane H$_2$/CO$_2$ Selectivity = 10 | | Second Separation Membrane CO$_2$/H$_2$ Selectivity = 100 | |
| | | (2) First Non-Permeated Gas | (3) First Permeated Gas | (4) Second Non-Permeated Gas | (5) Second Permeated Gas |
|---|---|---|---|---|---|
| N$_2$ | 45.0 | 64.0 | 3.5 | 83.5 | 0.7 |
| H$_2$ | 30.0 | 7.5 | 79.2 | 9.5 | 0.9 |
| CO$_2$ | 25.0 | 28.5 | 17.3 | 7.0 | 98.4 |

TABLE 5

| | Example 1 | Comparative Example 1 | Comparative Example 2 | Comparative Example 3 |
|---|---|---|---|---|
| CO$_2$/H$_2$ Selectivity of Second Separation Membrane | 100 | 380 | 30 | 100 |
| CO$_2$ Concentration in Second Permeated Gas (% by volume) | 98.7 | 98.7 | 95.0 | 98.4 |
| CO$_2$ Recovery Rate of Second Separation Membrane (%) | 80 | 80 | 64 | 63 |

Table 1 shows the compositions of the gases (1) to (5) (i.e., the mixed gas, the first non-permeated gas, the first permeated gas, the second non-permeated gas, and the second permeated gas) in the mixed gas separation device 3 according to Example 1. In Example 1, the first separation membrane 310 had H$_2$/CO$_2$ selectivity of 100, and the second separation membrane 320 had CO$_2$/H$_2$ selectivity of 100. The composition of each gas in Table 1 (i.e., N$_2$ concentration, H$_2$ concentration, or CO$_2$ concentration) was calculated by a process simulator. The composition of each gas shown in Tables 2 to 4 described later was also calculated by a process simulator in the same manner as in Table 1.

In Example 1, the N$_2$ concentration, the H$_2$ concentration, and the CO$_2$ concentration in the mixed gas supplied from the mixed-gas supplier 34 to the first separation membrane module 31 were 45.0% by volume, 30.0% by volume, and 25.0% by volume, respectively. The CO$_2$ concentration in the mixed gas was 30.0% by volume or less and low. The same applies to the composition of the mixed gas in Comparative Examples 1 to 3 described below.

In Example 1, the H$_2$ concentration in the first permeated gas that had permeated through the first separation mem-brane, i.e., the H$_2$ separation membrane, was 97.2% by volume (i.e., 90% or more by volume) and high. The CO$_2$ concentration in the first non-permeated gas that had not permeated through the first separation membrane 310 was 32.4% by volume and 5% or more by volume higher than the CO$_2$ concentration (25.0% by volume) in the mixed gas. The CO$_2$ concentration in the second permeated gas that had permeated through the second separation membrane 320, i.e., the CO$_2$ separation membrane, was 98.7% by volume (i.e., 97% or more by volume) and high. The N$_2$ concentration in the second non-permeated gas that had not permeated through the second separation membrane 320 was 81.1% by volume (i.e., 60% or more by volume). The H$_2$ concentration in the second non-permeated gas was 10.8% by volume (i.e., 30% or less by volume) and low, and the CO$_2$ concentration in the second non-permeated gas was 8.1% by volume (i.e., 30% or less by volume) and low. This indicates that the first separation membrane module 31 can efficiently separate Hz, and the second separation membrane module 32 can efficiently separate CO$_2$.

As shown in Table 5, in Example 1, the CO$_2$ recovery rate of the second separation membrane 320 in the second separation membrane module 32 was 80% (i.e., 70% or higher) and high. In Table 5, the CO$_2$/H$_2$ selectivity of the second separation membrane 320, the CO$_2$ concentration in the second permeated gas, and the CO$_2$ recovery rate of the second separation membrane 320 were compared between Example 1 and Comparative Examples 1 to 3.

Table 2 shows the compositions of the gases (1) to (5) in the mixed gas separation device 3 according to Comparative Example 1. In Comparative Example 1, the first separation membrane 310 was omitted, and the second separation membrane 320 had CO$_2$/H$_2$ selectivity of 380. The CO$_2$/H$_2$ selectivity of the second separation membrane 320 in Comparative Example 1 was the value set in order to make the CO$_2$ recovery rate (see Table 5) of the second separation membrane 320 approximately the same as that in Example 1, and the value was excessively high. Through this setting, the CO$_2$ concentration in the second permeated gas and the CO$_2$ recovery rate of the second separation membrane 320 in Comparative Example 1 were made the same as those in Example 1. Meanwhile, the $N_2$ concentration in the second non-permeated gas that had not permeated through the second separation membrane 320 was 56.4% by volume (i.e., less than 60% by volume) and lower than that in Example 1. The Ha concentration in the second non-permeated gas was 37.3% by volume (i.e., higher than 30% by volume) and higher than that in Example 1.

Table 3 shows the compositions of the gases (1) to (5) in the mixed gas separation device 3 according to Comparative Example 2. In Comparative Example 2, the first separation membrane 310 had $H_2/CO_2$ selectivity of 10, and the second separation membrane 320 had $CO_2/H_2$ selectivity of 30. These numeric values were obtained in accordance with Japanese Patent Application Laid-Open No. 2008-247632 described above, which is incorporated herein by this reference.

In Comparative Example 2, the $H_2$ concentration in the first permeated gas that had permeated through the first separation membrane 310, i.e., the $H_2$ separation membrane, was 79.2% by volume (i.e., less than 90% by volume) and low. The $CO_2$ concentration in the first non-permeated gas that had not permeated through the first separation membrane 310 was 28.5% by volume, and a difference thereof from the $CO_2$ concentration in the mixed gas (25.0% by volume) was less than 5% by volume and small. Accordingly, it can be found from Comparative Example 2 that the separation of $H_2$ by the first separation membrane module 31 is less sufficient than that in Example 1. In Comparative Example 2, the $CO_2$ concentration in the second permeated gas that had permeated through the second separation membrane 320, i.e., the $CO_2$ separation membrane, was 95.0% by volume (i.e., less than 97% by volume) and lower than that in Example 1. The $CO_2$ recovery rate of the second separation membrane module 32 was 64% (i.e., less than 70%) and lower than that in Example 1.

Table 4 shows the compositions of the gases (1) to (5) in the mixed gas separation device 3 according to Comparative Example 3. In Comparative Example 3, the first separation membrane 310 had $H_2/CO_2$ selectivity of 10, which was the same as that in Comparative Example 2, and the second separation membrane 320 had $CO_2/H_2$ selectivity of 100, which was the same as that in Example 1.

In Comparative Example 3, the $H_2$ concentration in the first permeated gas that had permeated through the first separation membrane 310, i.e., the $H_2$ separation membrane, was 79.2% by volume (i.e., less than 90% by volume) and low. The $CO_2$ concentration in the first non-permeated gas that had not permeated through the first separation membrane 310 was 28.5% by volume, and a difference thereof from the $CO_2$ concentration (25.0% by volume) in the mixed gas was less than 5% by volume and small. Accordingly, as in the case of Comparative Example 2, it can be seen from Comparative Example 3 that the separation of $H_2$ by the first separation membrane module 31 is less sufficient than that in Example 1. In Comparative Example 3, the $CO_2$ concentration in the second permeated gas that has permeated through the second separation membrane 320, i.e., the $CO_2$ separation membrane, was 98.4% by volume. The $CO_2$ recovery rate of the second separation membrane module 32 was 63% (i.e., less than 70%) and lower than that in Example 1.

As described above, the mixed gas separation method includes the step (steps S11 and S12) of supplying a mixed gas containing at least $N_2$, $H_2$, and $CO_2$ and having a $CO_2$ concentration of 30% or less by volume to the first separation membrane 310 that selectively allows passage of $H_2$ to separate the mixed gas into the first permeated gas that has permeated through the first separation membrane 310 and the first non-permeated gas that has not permeated through the first separation membrane 310, the step (steps S13 and S14) of supplying the first non-permeated gas to the second separation membrane 320 that selectively allows passage of $CO_2$ to separate the first non-permeated gas into the second permeated gas that has permeated through the second separation membrane 320 and the second non-permeated gas that has not permeated through the second separation membrane 320, and the step (steps S15 and S16) of supplying the second non-permeated gas to the $CO_2$ collector 33 that separates and collects $CO_2$ by the separation method other than membrane separation to collect $CO_2$ contained in the second non-permeated gas. The $CO_2$ concentration in the first non-permeated gas is 5% or more by volume higher than the $CO_2$ concentration in the mixed gas. The $N_2$ concentration in the second non-permeated gas is higher than or equal to 50% by volume. The $H_2$ concentration in the second non-permeated gas is lower than or equal to 30% by volume.

Accordingly, it is possible to efficiently separate $CO_2$ from the mixed gas with a low concentration (i.e., 30% or less by volume) of $CO_2$ without using a separation membrane that has considerably high $CO_2/H_2$ selectivity. It is also possible to reduce the amount of $H_2$ flowing into the $CO_2$ collector 33 because $H_2$ can also be separated efficiently from the mixed gas. Accordingly, the structure of the $CO_2$ collector 33 is simplified (e.g., a structure such as an explosion-proof construction may be reduced in number or may be omitted).

The mixed gas separation device 3 described above includes the first separation membrane 310, the second separation membrane 320, the $CO_2$ collector 33, the mixed-gas supplier 34, the first non-permeated gas passage 312, and the second non-permeated gas passage 322. The first separation membrane 310 is selectively permeable to $H_2$. The second separation membrane 320 is selectively permeable to $CO_2$. The $CO_2$ collector 33 separates and collects $CO_2$ by a separation method other than membrane separation. The mixed-gas supplier 34 supplies a mixed gas containing at least $N_2$, $H_2$, and $CO_2$ and having a $CO_2$ concentration of 30% or less by volume, to the first separation membrane 310. The first non-permeated gas passage 312 guides the first non-permeated gas that has not permeated through the first separation membrane 310 in the mixed gas to the second separation membrane 320. The second non-permeated gas passage 322 guides the second non-permeated gas that has not permeated through the second separation membrane 320 in the first non-permeated gas supplied through the first non-permeated gas passage 312, to the $CO_2$ collector 33. The $CO_2$ collector 33 collects $CO_2$ in the second non-permeated gas supplied through the second non-permeated gas passage 322. The $CO_2$ concentration in the first non-permeated gas is 5% or more by volume higher than the $CO_2$ concentration in the mixed gas. The $N_2$ concentration in the second non-permeated gas is higher than or equal to 50% by volume. The $H_2$ concentration in the second non-permeated gas is lower than or equal to 30% by volume.

Accordingly, as described above, it is possible to efficiently separate $CO_2$ from the mixed gas with a low concentration (i.e., 30% or less by volume) of $CO_2$ without using a separation membrane that has considerably high $CO_2/H_2$ selectivity. Besides, it is also possible to efficiently separate $H_2$ from the mixed gas. This simplifies the structure of the $CO_2$ collector 33.

In the mixed gas separation method described above, it is preferable that the first permeated gas is mixed with the gas exhausted from the $CO_2$ collector 33 (i.e., exhaust gas) after steps S11 and S12. It is also preferable that the mixed gas separation device 3 further includes the first permeated gas passage 311 that guides the first permeated gas to be mixed with the gas exhausted from the $CO_2$ collector 33 (i.e., exhaust gas). This allows $H_2$ in the second non-permeated gas supplied to the $CO_2$ collector 33 to be used together with $H_2$ in the first permeated gas. That is, it is possible to effectively use $H_2$ in the mixed gas.

As described above, it is preferable that the $CO_2$ recovery rate of the second separation membrane 320 is higher than or equal to 70%. In this case, it is possible to reduce the size of the $CO_2$ collector 33 and to reduce the production and running costs of the mixed gas separation device 3.

As described above, it is preferable that the separation method used in the $CO_2$ collector 33 to separate $CO_2$ is chemical absorption. In this case, it is possible to further reduce the production cost of the mixed gas separation device 3 while increasing the $CO_2$ recovery rate of the $CO_2$ collector 33.

As described above, it is preferable that the $N_2$ concentration in the second non-permeated gas is higher than or equal to 60% by volume, and the $CO_2$ concentration in the second non-permeated gas is lower than or equal to 30% by volume. The mixed gas separation device 3 can achieve these concentrations because of its ability to efficiently separate $CO_2$.

As described above, it is preferable that the $CO_2$ concentration in the second permeated gas is higher than or equal to 97% by volume. The mixed gas separation device 3 can achieve these concentrations because of its ability to efficiently separate $CO_2$.

As described above, it is preferable that the pressure of the mixed gas supplied to the first separation membrane 310 in steps S11 and S12 is higher than or equal to 1.5 MPaG. Even under such high pressure, the mixed gas separation method and the mixed gas separation device 3 described above are capable of efficiently separating $CO_2$.

As described above, it is preferable that the first separation membrane 310 has $H_2/CO_2$ selectivity of 100 or higher, and the second separation membrane 320 has $CO_2/H_2$ selectivity of 100 or higher. This allows the first separation membrane 310 to more efficiently separate $H_2$ and allows the second separation membrane 320 to more efficiently separate $CO_2$.

As described above, it is preferable that at least one of the first separation membrane 310 or the second separation membrane 320 is a zeolite membrane. If the separation membranes (i.e., the first separation membrane 310 and/or the second separation membrane 320) are formed of zeolite crystals having a uniform pore diameter, they can more efficiently separate their selective permeated substance (i.e., $H_2$ and/or $CO_2$).

In the mixed gas separation device 3 illustrated in FIG. 1, the first permeated gas passage 311 merges with the exhaust passage 332, but the present invention is not intended to be limited to this example. For example, the first permeated gas passage 311 may be independent of the exhaust passage 332 and may be connected to an external device (e.g., a gas turbine for power generation) outside the mixed gas separation device 3. Alternatively, as illustrated in FIG. 8, the first permeated gas passage 311 extending from the first separation membrane module 31 may be connected to the $CO_2$ collector 33.

Figure 8:
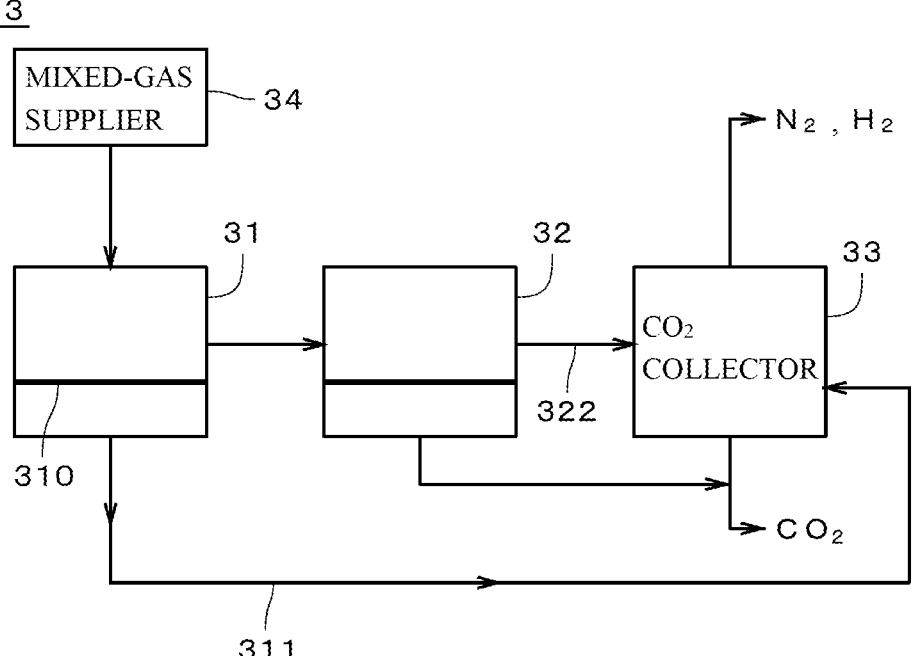
FIG. 8 is an illustration of a configuration of a different mixed gas separation device.

In the example illustrated in FIG. 8, the first permeated gas passage 311 guides the first permeated gas that has permeated through the first separation membrane 310 in the first separation membrane module 31 to the $CO_2$ collector 33 and causes the first permeated gas to be mixed with the second non-permeated gas supplied from the second separation membrane module 32 to the $CO_2$ collector 33 inside the $CO_2$ collector 33. As another alternative, the first permeated gas passage 311 may merge with the second non-permeated gas passage 322 between the second separation membrane module 32 and the $CO_2$ collector 33. In this case, the first permeated gas is mixed with the second non-permeated gas and then supplied to the $CO_2$ collector 33.

As described thus far, in the mixed gas separation method, it is possible to collect even $CO_2$ contained in the first permeated gas by supplying the first permeated gas to the $CO_2$ collector 33 after steps S11 and S12 described above. As a result, the recovery rate of $CO_2$ from the mixed gas is improved. The mixed gas separation device 3 that further includes the first permeated gas passage 311 to guide the first permeated gas to the $CO_2$ collector 33 is capable of improving the recovery rate of $CO_2$ from the mixed gas in the same manner as described above.

The mixed gas separation method and the mixed gas separation device 3 described above may be modified in various ways.

For example, the structures of the first separation membrane module 31 and the second separation membrane module 32 are not limited to the examples described above and may be modified in various ways.

The first separation membrane 310 may have $H_2/CO_2$ selectivity lower than 100. The second separation membrane 320 may also have $CO_2/H_2$ selectivity lower than 100.

The pressure of the mixed gas supplied to the first separation membrane 310 may be lower than 1.5 MPaG.

The $CO_2$ concentration in the second permeated gas may be lower than 97% by volume.

The $N_2$ concentration in the second non-permeated gas may be lower than 60% by volume as long as it is 50% by volume or higher. The $CO_2$ concentration in the second non-permeated gas may be higher than 30% by volume.

The $CO_2$ recovery rate of the second separation membrane 320 may be lower than 70%.

The configurations of the above-described preferred embodiments and variations may be appropriately combined as long as no mutual inconsistencies arise.

While the invention has been shown and described in detail, the foregoing description is in all aspects illustrative and not restrictive It is therefore to be understood that numerous modifications and variations can be devised without departing from the scope of the invention.

INDUSTRIAL APPLICABILITY

The present invention is applicable in separation of a mixed gas produced by coal gasification and shift reaction in integrated coal gasification combined cycle power generation, and may also be applicable in separation of other various mixed gases.

REFERENCE SIGNS LIST 3 mixed gas separation device
33 $CO_2$ collector
34 mixed-gas supplier
310 first separation membrane
320 second separation membrane
311 first permeated gas passage
312 first non-permeated gas passage
322 second non-permeated gas passage
S11 to S16 step

The invention claimed is:

1. A mixed gas separation method comprising:

a) supplying a mixed gas containing at least $N_2$, $H_2$, and $CO_2$ and having a $CO_2$ concentration of 30% or less by volume to a first separation membrane that selectively allows passage of $H_2$ to separate said mixed gas into a first permeated gas that has permeated through said first separation membrane and a first non-permeated gas that has not permeated through said first separation membrane;

b) supplying said first non-permeated gas to a second separation membrane that selectively allows passage of $CO_2$ to separate said first non-permeated gas into a second permeated gas that has permeated through said second separation membrane and a second non-permeated gas that has not permeated through said second separation membrane; and c) supplying said second non-permeated gas to a $CO_2$ collector that separates and collects $CO_2$ by a separation method other than membrane separation to collect $CO_2$ contained in said second non-permeated gas, wherein said first non-permeated gas has a $CO_2$ concentration that is 5% or more by volume higher than or equal to the $CO_2$ concentration in said mixed gas, said second non-permeated gas has an $N_2$ concentration of 50% or more by volume, and said second non-permeated gas has an $H_2$ concentration of 30% or less by volume.

2. The mixed gas separation method according to claim 1, wherein after said operation a), said first permeated gas is mixed with a gas exhausted from said $CO_2$ collector.

3. The mixed gas separation method according to claim 1, wherein after said operation a), said first permeated gas is supplied to said $CO_2$ collector.

4. The mixed gas separation method according to claim 1, wherein said second separation membrane has a $CO_2$ recovery rate of 70% or higher.

5. The mixed gas separation method according to claim 1, wherein the separation method used in said $CO_2$ collector to separate $CO_2$ is chemical absorption.

6. The mixed gas separation method according to claim 1, wherein said second non-permeated gas has an $N_2$ concentration of 60% or more by volume, and said second non-permeated gas has a $CO_2$ concentration of 30% or less by volume.

7. The mixed gas separation method according to claim 1, wherein said second permeated gas has a $CO_2$ concentration of 97% or more by volume.

8. The mixed gas separation method according to claim 1, wherein said mixed gas supplied to said first separation membrane in said operation a) has a pressure of 1.5 MPaG or higher.

9. The mixed gas separation method according to claim 1, wherein said first separation membrane has $H_2/CO_2$ selectivity of 100 or higher, and said second separation membrane has $CO_2/H_2$ selectivity of 100 or higher.

10. The mixed gas separation method according to claim 1, wherein at least one of said first separation membrane or said second separation membrane is a zeolite membrane.

* * * * *